United States Patent
Ryoo et al.

(10) Patent No.: US 11,214,673 B2
(45) Date of Patent: Jan. 4, 2022

(54) HEAT-RESISTANT RESIN COMPOSITION AND AUTOMOBILE SPOILER MANUFACTURED USING THE SAME

(71) Applicant: LG CHEM, LTD., Seoul (KR)

(72) Inventors: Seung Cheol Ryoo, Daejeon (KR); Dae San Jung, Daejeon (KR); Seong Lyong Kim, Daejeon (KR); Jin Oh Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/764,310

(22) PCT Filed: Dec. 11, 2018

(86) PCT No.: PCT/KR2018/015678
§ 371 (c)(1),
(2) Date: May 14, 2020

(87) PCT Pub. No.: WO2019/117587
PCT Pub. Date: Jun. 20, 2019

(65) Prior Publication Data
US 2020/0369864 A1 Nov. 26, 2020

(30) Foreign Application Priority Data
Dec. 11, 2017 (KR) .......................... 10-2017-0169106

(51) Int. Cl.
| | | |
|---|---|---|
| *C08L 25/12* | (2006.01) | |
| *B62D 29/04* | (2006.01) | |
| *B62D 35/00* | (2006.01) | |
| *B62D 65/16* | (2006.01) | |

(52) U.S. Cl.
CPC ............ *C08L 25/12* (2013.01); *B62D 29/043* (2013.01); *B62D 35/00* (2013.01); *B62D 65/16* (2013.01); *C08L 2201/08* (2013.01); *C08L 2205/025* (2013.01); *C08L 2205/03* (2013.01); *C08L 2205/035* (2013.01); *C08L 2207/53* (2013.01)

(58) Field of Classification Search
CPC ...... C08L 9/02; C08L 9/04; C08L 9/06; C08L 9/08; C08L 55/02; C08L 25/12; C08L 2205/035; C08L 2205/03; C08L 2205/025
See application file for complete search history.

(56) References Cited

U.S. PATENT DOCUMENTS

| | | | | |
|---|---|---|---|---|
| 5,637,179 | A | * 6/1997 | Nakayama | ............. C08G 59/18 156/330 |
| 2008/0167426 | A1 | * 7/2008 | Kim | ........................ C08L 25/12 525/71 |
| 2013/0280468 | A1 | * 10/2013 | Gomibuchi | ........... B29C 44/445 428/71 |
| 2016/0200947 | A1 | * 7/2016 | Husemann | ............. C09J 133/04 156/331.7 |
| 2017/0240744 | A1 | * 8/2017 | Nakamata | ............... C08L 63/00 |
| 2019/0144567 | A1 | * 5/2019 | Leslie | ..................... C08L 25/06 525/54.1 |

FOREIGN PATENT DOCUMENTS

| | | |
|---|---|---|
| CN | 107446301 A | 12/2017 |
| KR | 10-2005-0063129 A | 6/2005 |
| KR | 10-0567834 | 4/2006 |
| KR | 10-0717548 B1 | 11/2007 |
| KR | 10-2009-0020851 A | 2/2009 |
| KR | 10-2015-0004249 A | 1/2015 |
| KR | 10-2015-0067714 A | 6/2015 |
| KR | 10-2015-0102446 A | 9/2015 |
| KR | 10-2016-0127262 A | 11/2016 |
| KR | 10-2016-0129746 A | 11/2016 |
| WO | WO2006059819 A1 | 6/2006 |

OTHER PUBLICATIONS

Cheil Industries (electraonic translation of KR 10-071754800), May 2007.*
Extended European Search Report for PCT/KR2018015678 dated Nov. 23, 2020.

* cited by examiner

*Primary Examiner* — Jeffrey C Mullis

(57) ABSTRACT

The present invention relates to a heat-resistant resin composition including a first copolymer including a conjugated diene-based polymer, units derived from an aromatic vinyl-based monomer, and units derived from a vinyl cyan-based monomer; a second copolymer including units derived from an aromatic vinyl-based monomer and units derived from a vinyl cyan-based monomer and having a glass transition temperature of 115° C. or more; and a third copolymer including units derived from an aromatic vinyl-based monomer and units derived from a vinyl cyan-based monomer, wherein the second copolymer has a linear shape, and the third copolymer has a branched shape and a branched degree of 2 to 8.

20 Claims, 2 Drawing Sheets

HEAT-RESISTANT RESIN COMPOSITION AND AUTOMOBILE SPOILER MANUFACTURED USING THE SAME

CROSS-REFERENCE TO RELATED APPLICATION

The present application is a National Phase entry of International Application No. PCT/KR2018/015678 filed Dec. 11, 2018, which claims the priority benefit of Korean Patent Application No. 10-2017-0169106, filed on Dec. 11, 2017 in the Korean Intellectual Property Office, the disclosure of which is incorporated herein by reference.

TECHNICAL FIELD

The present invention relates to a heat-resistant resin composition and an automobile spoiler manufactured using the same, and more particularly, to a heat-resistant resin composition including a branched copolymer and an automobile spoiler manufactured using the same.

BACKGROUND ART

Spoilers, which are very large and are used in automobiles, are generally manufactured by a blow molding process using a heat-resistant resin composition including an ABS copolymer.

A method of manufacturing such an automobile spoiler includes a step of melting a pellet-shaped heat-resistant resin composition prepared by an extrusion process; a step of applying hydraulic pressure to the melted heat-resistant resin composition to produce a parison; a step of blow-molding a parison in a mold to manufacture a molded article; a step of trimming the molded article; a step of sanding the trimmed molded article; and a step of painting the sanded molded article to manufacture a spoiler.

Since an automobile spoiler is very large, the weight of a parison for blow-molding used to manufacture the same is 3 to 8 kg. That is, the parison is very heavy. Accordingly, when the weight average molecular weight of components of a heat-resistant resin composition used to produce the parison is small, melt strength is weak, whereby the parison may sag due to the weight of the parison itself during production of the parison. When a copolymer having a large weight average molecular weight is included in the heat-resistant resin composition to address the problem, sagging of a parison may be prevented, but excessive pressure should be applied to a parison due to a high melt viscosity. However, such excessive pressure may cause melt fracture, which may cause a defect wherein clamp shapes are generated on a product surface. Such a parison surface defect is still present on a molded article which has been blow-molded, which causes a surface defect of a final product, a spoiler.

Accordingly, to prevent melt fracture during production of a parison for manufacturing a spoiler, it is advantageous for a melted heat-resistant resin composition to have high fluidity, i.e., a melt index for compression at a relatively high shear rate, when passing through a die located at a lower part of an accumulator. In addition, to prevent sagging due to the weight of a parison itself after passing through the die, it is advantageous for the melted heat-resistant resin composition to have low fluidity, i.e., a flow index for an elongation mode at a low shear rate.

However, since there is a trade-off between melt fracture and melt strength and thus a process window is very narrow, it is very difficult to manufacture a high-quality spoiler.

DISCLOSURE

Technical Problem

The present invention is directed to providing a heat-resistant resin composition that does not exhibit surface defects and parison sagging during blow-molding.

Technical Solution

One aspect of the present invention provides a heat-resistant resin composition including a first copolymer including a conjugated diene-based polymer, units derived from an aromatic vinyl-based monomer, and units derived from a vinyl cyan-based monomer; a second copolymer including units derived from an aromatic vinyl-based monomer and units derived from a vinyl cyan-based monomer and having a glass transition temperature of 115° C. or more; and a third copolymer including units derived from an aromatic vinyl-based monomer and units derived from a vinyl cyan-based monomer, wherein the second copolymer has a linear shape, and the third copolymer has a branched shape and a branched degree of 2 to 8.

Advantageous Effects

A heat-resistant resin composition according to the present invention does not exhibit surface defects and parison sagging, caused by melt fracture, during blow-molding. Accordingly, the heat-resistant resin composition can be used as a suitable material for an automobile spoiler.

MODES OF THE INVENTION

Figure 1:
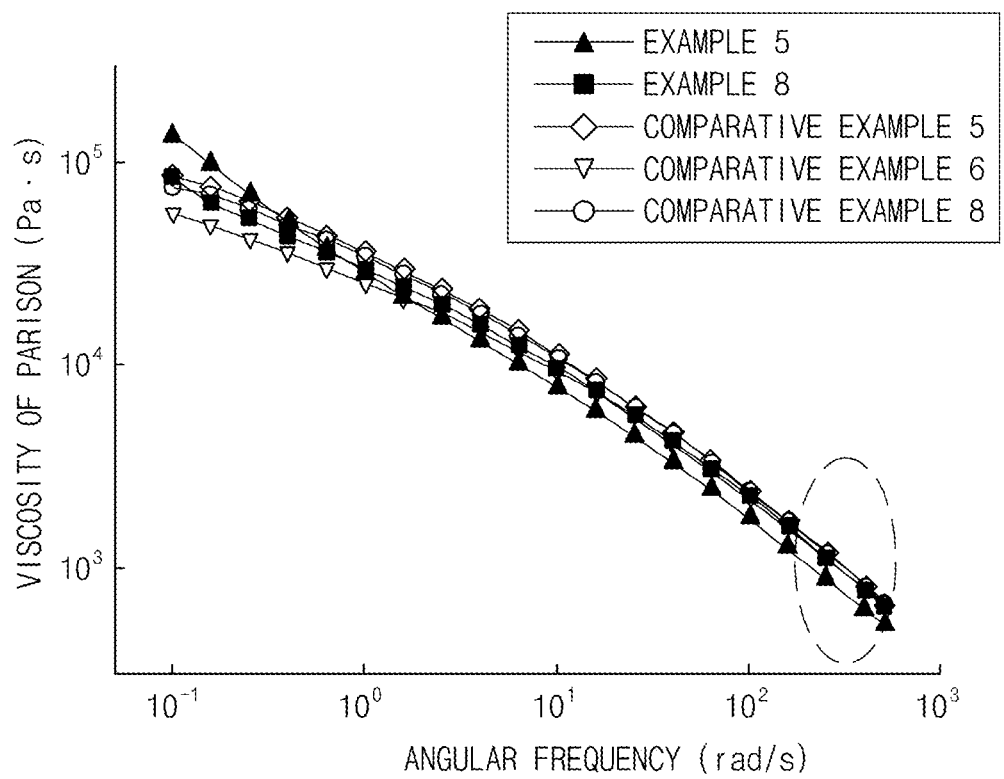
FIG. 1 illustrates viscosities of parisons according to angular frequency.

Now, the present invention will be described in more detail to help understand the present invention.

Terms or words used in the specification and the following claims shall not be limited to common or dictionary meanings, and have meanings and concepts corresponding to technical aspects of the embodiments of the present invention so as to most suitably express the embodiments of the present invention.

In the present invention, a branched degree, an absolute molecular weight, and a polydispersity index were measured and calculated using Viscotek TDA 305 manufactured by Malvern.

Viscotek TDA (Triple/tertra detector array) manufactured by Malvern is equipped with all of a refractive index detector, a light scattering detector, an intrinsic viscosity detector. When the Viscotek TDA was used, measurement conditions were as follows: column: PL olexis x2+C, eluent: tetrahydrofuran (THF), flow rate: 1.0 mL/min, temperature: 40° C., and injection amount: 100 μg. First, an absolute molecular weight was determined using refractive index data and light scattering data. Next, a branched degree was calculated using refractive index data and intrinsic viscosity data and applying a trifunctional branch model.

In the present invention, a weight average molecular weight may be measured as a relative value to a standard polystyrene (PS) sample through gel permeation chromatography (GPC, Waters Breeze) using tetrahydrofuran (THF) as an eluent.

In the present invention, a graft ratio may be calculated according to the following equation after obtaining an insoluble content by adding a predetermined amount of graft copolymer, as a first copolymer, to a solvent, dissolving the same using a vibrator, and centrifuging the same using a centrifuge.

In particular, a predetermined amount of a graft copolymer, as the first copolymer, was added to acetone, followed by vibrating by means of a vibrator (trade name: SI-600R, manufacturer: Lab Companion) for 24 hours to dissolve a free graft copolymer. The resulting solution was centrifuged at 14,000 rpm for 1 hour using a centrifuge and dried at 140° C. for 2 hours using a vacuum dryer (trade name: DRV320DB, manufacturer: ADVANTEC), thereby obtaining an insoluble content. A graft ratio (%) may be calculated according to the following equation:

> Graft ratio (%)=[(Weight of grafted shell)/weight of added conjugated diene-based polymer(rubber)]×100=[{(Weight of insoluble content after centrifugation of grafted copolymer)−(weight of added conjugated diene-based polymer (rubber))}/weight of added conjugated diene-based polymer(rubber)]×100

Weight of added conjugated diene-based polymer (rubber)=Weight of graft copolymer after drying latex×fraction of conjugated diene-based polymer (rubber)

In the present invention, the weight average molecular weight of a shell constituting the first copolymer may mean the weight average molecular weight of a copolymer including units derived from an aromatic vinyl-based monomer and units derived from a vinyl cyan monomer grafted to a conjugated diene-based polymer.

In the present invention, the weight average molecular weight of a shell constituting the first copolymer may be obtained as a relative value to a standard polystyrene (PS) sample through gel permeation chromatography after dissolving the insoluble content, obtained according to the graft ratio measurement method, in a tetrahydrofuran (THF) solution at 1% by weight, and then filtering with a 1 μm filter.

In the present invention, an average particle diameter of a conjugated diene-based polymer may be measured with a dynamic light scattering (DLS) method using a Nicomp 380 particle size analyzer and may be defined as a particle diameter corresponding to 50% of a scattering intensity particle diameter in a particle size distribution curve.

1. Heat-Resistant Resin Composition

A heat-resistant resin composition according to an embodiment of the present invention includes 1) a first copolymer including a conjugated diene-based polymer, units derived from an aromatic vinyl-based monomer, and units derived from a vinyl cyan-based monomer; 2) a second copolymer including units derived from an aromatic vinyl-based monomer and units derived from a vinyl cyan-based monomer and having a glass transition temperature of 115° C. or more; and 3) a third copolymer including units derived from an aromatic vinyl-based monomer and units derived from a vinyl cyan-based monomer, wherein the second copolymer has a linear shape, and the third copolymer has a branched shape and a branched degree of 2 to 8.

A heat-resistant resin composition according to another embodiment of the present invention may further include 4) a fourth copolymer including units derived from an aromatic vinyl-based monomer and units derived from a vinyl cyan-based monomer and having a glass transition temperature and 106° C. or less and a linear shape.

Hereinafter, each component of the heat-resistant resin composition according to the embodiment of the present invention will be described in detail.

1) First Copolymer

The first copolymer is a graft copolymer and includes a conjugated diene-based polymer, units derived from an aromatic vinyl-based monomer, and units derived from a vinyl cyan-based monomer.

The first copolymer may impart excellent impact strength to a heat-resistant resin composition.

The conjugated diene-based polymer may include a conjugated diene-based polymer modified by graft-polymerizing an aromatic vinyl-based monomer and a vinyl cyan-based monomer with a conjugated diene-based polymer prepared by polymerizing conjugated diene-based monomers.

The conjugated diene-based monomer may be one or more selected from the group consisting of 1,3-butadiene, isoprene, chloroprene and piperylene. Thereamong, 1,3-butadiene is preferred.

The conjugated diene-based polymer may have an average particle diameter of 0.1 to 0.5 μm, 0.2 to 0.4 μm, or 0.25 to 0.35 μm. Thereamong, an average particle diameter of 0.25 to 0.35 μm is preferred. Within these ranges, the impact strength of the first copolymer may be further improved.

The conjugated diene-based polymer may be included in an amount of 40 to 75% by weight, 45 to 70% by weight, or 50 to 65% by weight based on a total weight of the first copolymer. Thereamong, an amount of 50 to 65% by weight is preferred from an economic point of view. Within these ranges, chemical resistance, stiffness, impact resistance, processability, and surface gloss of the first copolymer may be further improved.

The units derived from the aromatic vinyl-based monomer may be units derived from one or more selected from the group consisting of styrene, α-methyl styrene, α-ethyl styrene and p-methyl styrene. Thereamong, units derived from styrene are preferred.

The units derived from the aromatic vinyl-based monomer may be included in an amount of 18 to 43% by weight, 22 to 40% by weight, or 25 to 36% by weight based on a total weight of the first copolymer. Thereamong, an amount of 25 to 36% by weight is preferred. Within these ranges, chemical resistance, stiffness, impact resistance, processability, and surface gloss of a heat-resistant resin composition may be further improved.

The units derived from the vinyl cyan-based monomer may be units derived from one or more selected from the group consisting of acrylonitrile, methacrylonitrile, phenyl acrylonitrile, and α-chloro acrylonitrile. Thereamong units derived from acrylonitrile are preferred.

The units derived from the vinyl cyan-based monomer may be included in an amount of 7 to 17% by weight, 8 to 15% by weight, or 10 to 14% by weight based on a total weight of the first copolymer. Thereamong, an amount of 10 to 14% by weight is preferred. Within these ranges, chemical resistance, stiffness, impact resistance, processability, and surface gloss of a heat-resistant resin composition may be further improved.

The first copolymer may have a graft ratio of 30 to 60%, 35 to 55%, or 40 to 50%. Thereamong, a graft ratio of 40 to 50% is preferred. Within these ranges, thermal stability and impact strength of the third copolymer may be balanced.

A weight average molecular weight of a shell constituting the first copolymer may be 50,000 to 200,000 g/mol, 70,000 to 150,000 g/mol, 80,000 to 120,000 g/mol, or 90,000 to 110,000 g/mol. Thereamong, a weight average molecular weight of 90,000 to 110,000 g/mol is preferred. Within these ranges, sagging of a parison and melt fracture thereof which are in a trade-off relationship may be appropriately adjusted, thereby minimizing surface defects due to sagging and melt fracture of a parison.

The first copolymer may be prepared by one or more methods selected from the group consisting of suspension polymerization, emulsion polymerization, and bulk polymerization. Thereamong, an emulsion polymerization method is preferred.

The first copolymer may be included in an amount of 20 to 55% by weight, 25 to 50% by weight, or 30 to 45% by weight based on a total weight of a heat-resistant resin composition. Thereamong, an amount of 30 to 40% by weight is preferred. Within these ranges, impact strength of a heat-resistant resin composition may be further improved.

2) Second Copolymer

The second copolymer includes units derived from an aromatic vinyl-based monomer, and units derived from a vinyl cyan-based monomer and is a linear copolymer having a glass transition temperature of 115° C. or more.

The second copolymer may impart heat resistance to a heat-resistant resin composition, and may minimize sagging and melt fracture of a parison during blow-molding performed to manufacture an automobile spoiler.

The second copolymer may have a glass transition temperature of 115° C. to 150° C., or 120° C. to 130° C. Within these ranges, heat resistance of a heat-resistant resin composition may be further improved and melt mixing and extrusion may be easily performed. When the second copolymer has a glass transition temperature of less than 115° C., heat resistance of a heat-resistant resin composition is decreased.

The units derived from the aromatic vinyl-based monomer may be units derived from an alkyl styrene-based monomer. The units derived from the alkyl styrene-based monomer may be units derived from one or more selected from the group consisting of α-methyl styrene, α-ethyl styrene, and p-methyl styrene. Thereamong, units derived from α-methyl styrene are preferred.

The units derived from the vinyl cyan-based monomer may be units derived from one or more selected from the group consisting of acrylonitrile, methacrylonitrile, phenyl acrylonitrile, and α-chloro acrylonitrile. Thereamong, units derived from acrylonitrile are preferred.

The second copolymer may include units derived from an aromatic vinyl-based monomer and units derived from a vinyl cyan-based monomer in a weight ratio of 60:40 to 90:10, 65:35 to 85:15, or 70:30 to 80:20. Thereamong, a weight ratio of 70:30 to 80:20 is preferred. Within these ranges, heat resistance may be further improved and melt fracture of a parison during blow-molding may be prevented.

The second copolymer may have a weight average molecular weight of 80,000 to 150,000 g/mol, 85,000 to 130,000 g/mol, or 90,000 to 110,000 g/mol. Thereamong, a weight average molecular weight of 90,000 to 110,000 g/mol is preferred. Within these ranges, heat resistance may be further improved and melt fracture of a parison during blow-molding may be prevented.

The second copolymer may be a linear α-methyl styrene/acrylonitrile copolymer.

The second copolymer may be prepared by one or more methods selected from the group consisting of suspension polymerization, emulsion polymerization, and bulk polymerization. Thereamong, bulk polymerization or emulsion polymerization is preferred.

The second copolymer may be included in an amount of 30 to 75 parts by weight, 35 to 70% by weight, or 40 to 65% by weight based on a total weight of a heat-resistant resin composition. Thereamong, an amount of 40 to 65% by weight is preferred. Within these ranges, heat resistance may be further improved and melt fracture of a parison during blow-molding may be prevented.

3) Third Copolymer

The third copolymer is a branched copolymer including units derived from an aromatic vinyl-based monomer and units derived from a vinyl cyan-based monomer, and has a branched degree of 2 to 8.

The third copolymer may have a high thinning property wherein a viscosity is high at a low shear rate and a viscosity is low at a high shear rate. Such a high thinning property may minimize a surface defect rate of a parison due to melt fracture thereof during blow-molding and may prevent sagging of a parison due to a decrease in melt strength thereof.

More particularly, when an automobile spoiler is manufactured using a heat-resistant resin composition including the third copolymer, a parison is discharged from a die at a lower part of an accumulator by pressurizing an accumulator of a blow molding machine, the viscosity of the parison is decreased. Since a force in a flow direction of a parison and a force in a gravity direction are decreased as a viscosity is low, melt fracture of a produced parison may be minimized. In addition, since a parison which has passed through a die can be continuously strain-hardened for a relatively long time, a decrease in melt strength may be minimized. Accordingly, sagging of a parison may be prevented until the parison which has passed through a die is supplied into a mold and the mold is closed.

The third copolymer preferably has a branched degree of 2 to 8 or 5 to 7.

Within these ranges, a high thinning property wherein a viscosity is high at a low shear rate and a viscosity is low at a high shear rate further is further reinforced. Accordingly, melt fracture of a parison may be minimized upon manufacturing of an automobile spoiler, whereby a surface defect rate of the parison may be minimized. In addition, sagging of the parison due to a decrease in melt strength of the parison may be prevented. When a branched degree of the third copolymer exceeds the ranges, a viscosity is low at a low shear rate and high at a high shear rate, which is unsuitable for blow molding performed to manufacture a spoiler. When a branched degree of the third copolymer is less than the ranges, sagging of a parison may occur.

The units derived from the aromatic vinyl-based monomer may be units derived from one or more selected from the group consisting of styrene, α-methyl styrene, α-ethyl styrene, and p-methyl styrene. Thereamong, units derived from styrene are preferred.

The units derived from the vinyl cyan-based monomer may be units derived from one or more selected from the group consisting of acrylonitrile, methacrylonitrile, phenyl acrylonitrile and α-chloro acrylonitrile. Thereamong, units derived from acrylonitrile are preferred.

The third copolymer may include the units derived from the aromatic vinyl-based monomer and the units derived from the vinyl cyan-based monomer in a weight ratio of 60:40 to 90:10, 65:35 to 85:15, or 72:28 to 77:20. Thereamong, a weight ratio of 72:28 to 77:20 is preferred. Within these ranges, a property balance between the third copolymer and the first copolymer is excellent and satisfactory processability is exhibited.

The third copolymer may have an absolute molecular weight of 500,000 to 700,000 g/mol, 550,000 to 650,000 g/mol, or 600,000 to 650,000 g/mol. Thereamong, an absolute molecular weight of 600,000 to 650,000 g/mol is preferred. Within these ranges, sagging of a parison may be prevented while preventing melt fracture during production of the parison.

The third copolymer may have a polydispersity index of 3.0 to 5.0 or 3.5 to 4.5. Thereamong, a polydispersity index of 3.5 to 4.5 is preferred. Within these ranges, since more uniform properties of the third copolymer may be realized, more uniform properties of a heat-resistant resin composition including the third copolymer may be realized.

The third copolymer may be prepared by one or more methods selected from the group consisting of suspension polymerization, emulsion polymerization, and bulk polymerization. Thereamong, suspension polymerization is preferred.

The third copolymer may be included in an amount of 2 to 20% by weight or 3 to 18% by weight based on a total weight of the heat-resistant resin composition. Thereamong, an amount of 3 to 18% by weight is preferred.

Within these ranges, melt strength may be high during blow-molding, whereby sagging of a parison may be prevented. In addition, an excessive increase in manufacturing costs may be prevented.

4) Fourth Copolymer

The fourth copolymer includes units derived from an aromatic vinyl-based monomer and units derived from a vinyl cyan-based monomer, and has a glass transition temperature of 106° C. or less and a linear shape.

The glass transition temperature of the fourth copolymer may be changed depending upon the content or weight average molecular weight of the units derived from the vinyl cyan-based monomer.

The fourth copolymer may be included to achieve a balance among properties of the heat-resistant resin composition, i.e., a balance among mechanical characteristics, fluidity, and heat resistance.

The fourth copolymer may have a glass transition temperature of 102 to 106° C. or 103 to 106° C. Thereamong, a glass transition temperature of 103 to 106° C. is preferred. Within these ranges, a property balance of the heat-resistant resin composition may be achieved rather than imparting heat resistance to the heat-resistant resin composition.

The fourth copolymer may include the units derived from the aromatic vinyl-based monomer and the units derived from the vinyl cyan-based monomer in a weight ratio of 50:50 to 90:10, 60:40 to 85:15, or 66:34 to 80:20. Thereamong, a weight ratio of 66:34 to 80:20 is preferred. Within these ranges, the fourth copolymer allows a more satisfactory property balance of the heat-resistant resin composition to be achieved.

The fourth copolymer may have a weight average molecular weight of 80,000 to 250,000 g/mol, 110,000 to 210,000 g/mol, or 140,000 to 170,000 g/mol. Thereamong, a weight average molecular weight of 140,000 to 170,000 g/mol is preferred. Within these ranges, the fourth copolymer allows a more satisfactory property balance of the heat-resistant resin composition to be achieved.

The fourth copolymer may be prepared by one or more methods selected from the group consisting of suspension polymerization, emulsion polymerization and bulk polymerization. Thereamong, bulk polymerization is preferred.

The fourth copolymer may be included in an amount of 30% by weight or less, preferably 2 to 27% by weight, based on a total weight of a heat-resistant resin composition. Within these ranges, a more satisfactory property balance of the heat-resistant resin composition may be achieved.

The heat-resistant resin composition according to an embodiment of the present invention may further include an additive such as a lubricant or an antioxidant.

2. Automobile Spoiler

An automobile spoiler according to an embodiment of the present invention may be manufactured using the heat-resistant resin composition of the present invention.

In particular, the automobile spoiler may be manufactured by a method including a step of melting a pellet-shaped heat-resistant resin composition prepared by an extrusion process; a step of applying hydraulic pressure to the melted heat-resistant resin composition to produce a parison; a step of blow-molding the parison in a mold to manufacture a molded article; a step of trimming the molded article; a step of sanding the trimmed molded article; and a step of painting the sanded molded article to manufacture a spoiler.

By using the heat-resistant resin composition according to the embodiment of the present invention, a surface defect caused by melt fracture in the parison production step may be minimized or prevented. In addition, sagging of a parison caused by a decrease in melt strength in the step of manufacturing a molded article may be prevented.

Exemplary embodiments of the present invention are described in detail so that those of ordinary skill in the art can easily carry out the present invention. The invention may, however, be embodied in many different forms and should not be construed as being limited to the embodiments set forth herein <Heat-Resistant Resin Composition Preparation>

Examples 1 to 4 and Comparative Examples 1 to 4

Components summarized in Table 1 below, 0.5 part by weight of N'N-ethylene bis-stearamide as a lubricant (trade name: EBA, manufacturer: SONGWON), 0.2 part by weight of polyethylene wax (trade name: LC102N, manufacturer: Lion Chemicals), 0.2 part by weight of octadecyl-3-(3,5-di-t-butyl-4-hydroxyphenyl)propionate (trade name: Songnox 1076, manufacturer: SONGWON) as an antioxidant, and 0.2 part by weight of 2,4-di-t-butylphenol dihydrogen phosphite cyclic neopentanetetrayl ester (trade name: PEP-24, manufacturer: ADEKA) were mixed to prepare a heat-resistant resin composition. The heat-resistant resin composition was kneaded in a 260° C. twin-screw extruder, thereby preparing a pellet-shaped heat-resistant resin composition.

TABLE 1

| Classification | First copolymer (parts by weight) ABS graft copolymer | Second copolymer (parts by weight) | | Third copolymer (parts by weight) Less branched SAN copolymer | Fourth copolymer (parts by weight) General linear SAN copolymer | Highly branched SAN copolymer |
| --- | --- | --- | --- | --- | --- | --- |
| | | High-molecular weight heat-resistant SAN copolymer | Low-molecular weight heat-resistant SAN copolymer | | | |
| Example 1 | 36 | — | 50 | 14 | — | — |
| Example 2 | 33 | — | 35 | 5 | 27 | — |
| Example 3 | 33 | — | 50 | 8 | 6 | — |
| Example 4 | 33 | — | 62 | 5 | — | — |
| Comparative Example 1 | 33 | 31 | 30 | — | 6 | — |
| Comparative Example 2 | 36 | 40 | — | — | 24 | — |
| Comparative Example 3 | 36 | — | 50 | — | 14 | — |
| Comparative Example 4 | 36 | — | 50 | — | — | 14 |

(1) First Copolymer

Trade name: DP280, manufacturer: LG Chemical, a butadiene copolymer: 60% by weight, the average particle diameter of the butadiene copolymer: 0.3 μm (2) Second Copolymer ① High-Molecular Weight Heat-Resistant SAN Copolymer Trade name: PW635, manufacturer: LG Chemical, weight average molecular weight: 175,000 g/mol, units derived from acrylonitrile: 26% by weight, units derived from α-methyl styrene: 74% by weight, glass transition temperature: 127° C.

② Low-Molecular Weight Heat-Resistant SAN Copolymer

Trade name: 99UH, manufacturer: LG Chemical, weight average molecular weight: 100,000 g/mol, units derived from acrylonitrile: 30% by weight, units derived from α-methyl styrene: 70% by weight, glass transition temperature: 123° C.

(3) Third Copolymer

Trade name: EMI-230B, manufacturer: Fine-Blend, branched degree: 5 to 7, polydispersity index: 4.2, absolute molecular weight: 630,000 g/mol, units derived from acrylonitrile: 25% by weight, units derived from styrene: 75% by weight (4) General Linear SAN Copolymer Trade name: 97HC, manufacturer: LG Chemical, weight average molecular weight: 153,000 g/mol, polydispersity index: 1.9, units derived from acrylonitrile: 25% by weight, units derived from styrene: 75% by weight, glass transition temperature: 105° C.

(5) Highly Branched SAN Copolymer

Trade name: EMI-330B, manufacturer: Fine-Blend, branched degree: 9 to 10, polydispersity index: 4.1, weight average molecular weight: 630,000 g/mol, units derived from acrylonitrile: 28% by weight, units derived from styrene: 72% by weight Experimental Example 1

The pellet-shaped heat-resistant resin composition of each of Example 1 to Example 4, Comparative Example 1 to Comparative Example 4 was injection-molded to manufacture a specimen. Properties of the specimen were measured according to the following methods. Results are summarized in Table 2.

(6) Izod impact strength (kg·cm/cm): A specimen having a thickness of 3.2 mm was notched according to ASTM D 256 to measure Izod impact strength thereof.

(7) Melt index (g/10 min): Measured under conditions of 220° C. and 10 kg according to ASTM D 1238.

(8) Heat deflection temperature (° C.): Measured using a specimen having a thickness of 6.4 mm according to ASTM D 648.

TABLE 2

| Classification | Izod impact strength (kg · cm/cm) | Melt index (g/10 min) | Heat deflection temperature (° C.) |
| --- | --- | --- | --- |
| Example 1 | 25 | 2.0 | 100 |
| Example 2 | 20 | 4.0 | 94 |
| Example 3 | 28 | 4.5 | 100 |
| Example 4 | 26 | 1.6 | 104 |
| Comparative Example 1 | 20 | 1.8 | 104 |
| Comparative Example 2 | 25 | 2.2 | 96 |
| Comparative Example 3 | 28 | 4.5 | 100 |
| Comparative Example 4 | 26 | 3.8 | 100 |

Referring to Table 2, it can be confirmed that, in the case of the specimens of Examples 1 to 4 and Comparative Examples 1 to 4, the heat deflection temperature increases with increasing content of the heat-resistant SAN copolymer.

Comparing the specimen of Example 1 with the specimen of Comparative Example 3, it can be confirmed that, when the branched SAN copolymer is included, although the impact strength is slightly decreased, the melt index is decreased.

Comparing the specimen of Example 1 with the specimen of Example 3, it can be confirmed that the melt index increases with decreasing content of the branched SAN copolymer. From the property evaluation results of the specimens of Examples 1 and 3 and Comparative Example 3, it can be confirmed that the branched SAN copolymer affects the melt index of the heat-resistant resin composition.

Comparing the specimen of Example 1 with the specimen of Comparative Example 4, it can be confirmed that the melt index increases with increasing branched degree.

Comparing the specimen of Example 2 with the specimen of Example 4, it can be confirmed that, with decreasing content of the heat-resistant SAN copolymer, the heat deflection temperature is lowered, the melt index increases, and the impact strength is decreased.

<Manufacture of Spoiler>

Examples 5 to 8 and Comparative Examples 5 to 8

The temperature of an extruder cylinder of a blow molding machine (trade name: YELBT, manufacturer: YOUNGIL) was set to 195° C., an internal temperature of an accumulator was set to 200° C., the temperature of a die at an end of the accumulator was set to 225° C., and a hydraulic pressure of an accumulator for producing a parison was set to 185 kg/cm².

First, each of pellet-shaped heat-resistant resin compositions summarized in Table 3 below was melted. The melted heat-resistant resin composition was fed into an accumulator of a blow molding machine. Hydraulic pressure was applied to the melted heat-resistant resin composition in the accumulator, thereby producing a parison. Here, a surface temperature of a parison discharged from a die of the accumulator was 215° C., and the weight thereof was about 5,400 g. The parison was blow-molded in a mold, thereby manufacturing a molded article. The molded article was processed to manufacture a spoiler. The weight of the manufactured spoiler was 2,370 g on average.

TABLE 3

| Classification | Heat-resistant resin composition |
|---|---|
| Example 5 | Example 1 |
| Example 6 | Example 2 |
| Example 7 | Example 3 |
| Example 8 | Example 4 |
| Comparative Example 5 | Comparative Example 1 |
| Comparative Example 6 | Comparative Example 2 |
| Comparative Example 7 | Comparative Example 3 |
| Comparative Example 8 | Comparative Example 4 |

Experimental Example 2

Moldability during blow-molding of each of the automobile spoilers of the examples and the comparative examples was evaluated. Results are summarized in Table 4 below.

(9) Surface defect due to melt fracture: A portion of a parison was cut during a manufacturing process of a spoiler, and a surface thereof was evaluated with the naked eye.
⊚: none, Δ: slightly occurs, x: severely occurs

(10) Sagging of parison: Downward sagging of a parison was observed with the naked eye when the parison was almost discharged from an accumulator and before a mold was closed to perform blow molding in a manufacturing process of a spoiler.
⊚: none, Δ: slightly occurs, x: severely occurs

TABLE 4

| Classification | Surface defect due to melt fracture | Sagging of parison |
|---|---|---|
| Example 5 | ⊚ | ⊚ |
| Example 6 | ⊚ | ⊚ |
| Example 7 | ⊚ | ⊚ |
| Example 8 | ⊚ | ⊚ |
| Comparative Example 5 | Δ | Δ |
| Comparative Example 6 | X | X |
| Comparative Example 7 | ⊚ | X |
| Comparative Example 8 | Δ | X |

Referring to Table 4, in the case of the automobile spoilers of Examples 5 to 8, surface defects due to melt fracture were not observed at all and sagging of the parison was also not observed at all.

However, in the case of the automobile spoilers of Comparative Examples 5 to 7 in which the heat-resistant resin composition excluding the branched SAN copolymer was used, surface defects or sagging of the parison was observed.

However, in the case of Comparative Example 8 in which the highly branched SAN copolymer was included, although surface defects were slightly observed, sagging of the parison was observed.

Experimental Example 3

A predetermined amount of a parison was collected when discharged from a die of an accumulator to measure viscosity thereof according to angular frequency. Results are illustrated in FIG. 1. At an angular frequency of 0 rad/s, sagging of a parison was prevented when a viscosity was high. At an angular frequency of $10^2$ to $10^3$ rad/s, melt fracture was prevented when a viscosity was low.

(11) Viscosity change dependent upon angular frequency: Measured using ARES-G2 Rheometer manufactured by TA Instruments.

Referring to FIG. 1, in the case of Examples 5 and 8, a viscosity increased when an angular frequency approached 0 rad/s, and a viscosity was decreased when an angular frequency was $10^2$ to $10^3$ rad/s. From these results, it could be predicted that melt fracture and sagging of a parison were prevented during blow molding.

In the case of Comparative Example 5, a viscosity was low, compared to Example 8, when an angular frequency approached 0 rad/s, and a viscosity was high at an angular frequency of $10^2$ to $10^3$ rad/s. From these results, it could be predicted that melt fracture and sagging of a parison occurred during blow molding. Meanwhile, although the viscosity of Comparative Example 5 in FIG. 1 is observed as not being much higher or lower than that of Example 8, this is due to a too narrow interval between units on a y axis. Actually, the viscosity of Comparative Example 5 is greatly different from that of Example 8.

In the case of Comparative Example 6, a viscosity was low when an angular frequency approached 0 rad/s and was high at an angular frequency of $10^2$ to $10^3$ rad/s. From these results, it could be predicted that melt fracture and sagging of a parison would occur during blow molding.

In the case of Comparative Example 8, a viscosity was low when an angular frequency approached 0 rad/s, and a viscosity was high at an angular frequency of $10^2$ to $10^3$ rad/s. From these results, it could be confirmed that melt fracture and sagging of a parison would occur during blow molding. Meanwhile, although the viscosity of Comparative Example 8 is not observed as being significantly higher than that of Example 8 when an angular frequency is $10^2$ to $10^3$ rad/s in FIG. 1, this is due to a too narrow interval between units on a y axis. Actually, the viscosity of Comparative Example 8 is greatly different from that of Example 8.

Experimental Example 4

Figure 2:
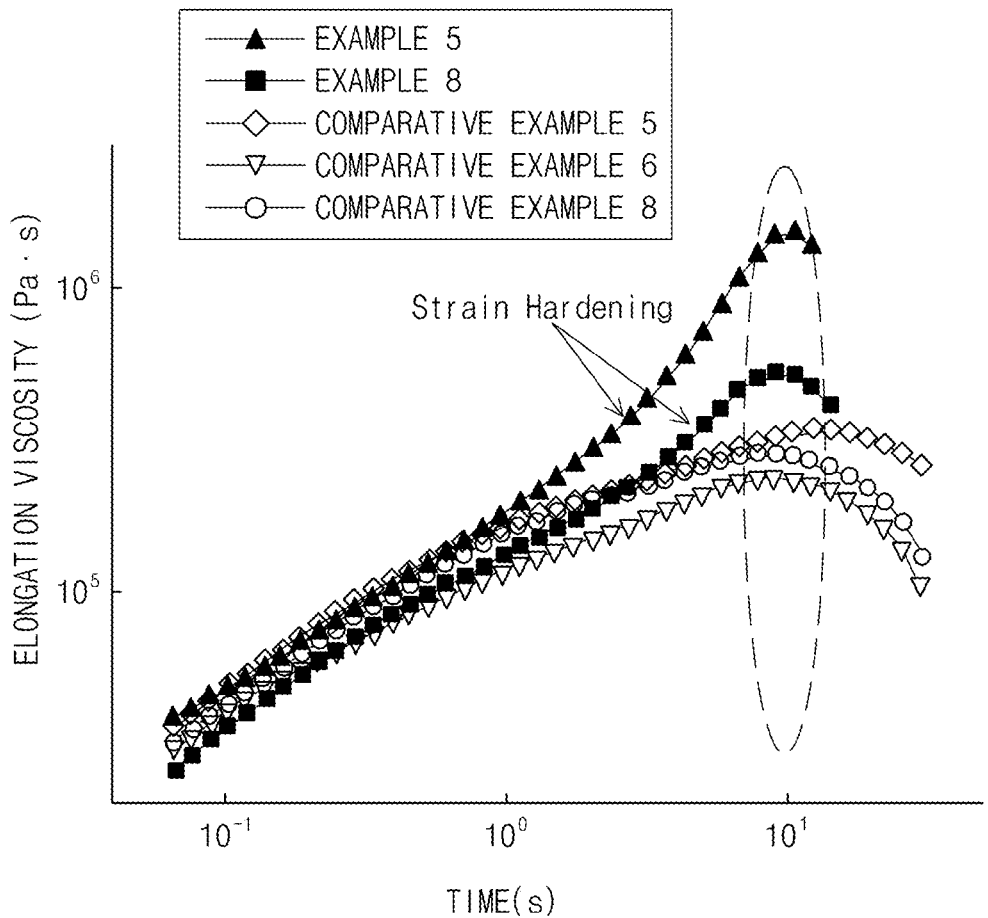
FIG. 2 illustrates elongation viscosities of parisons over time.

A predetermined amount of the parison of each of the examples and the comparative examples was collected when discharged from a die of an accumulator, and elongation viscosities thereof over time were measured. Results are illustrated in FIG. 2. A decrease of a slope of an elongation viscosity or a decrease of an elongation viscosity itself over time indicates that chains of a polymer separate from each other while a parison is sagging.

(12) Change in elongation viscosity over time: Measured using ARES-G2 Rheometer manufactured by TA instruments.

Referring to FIG. 2, in the case of Examples 5 and 8, since an elongation strength continuously increased until 10 seconds, strain hardening occurred. It could be predicted that sagging of a parison did not occur due to the strain hardening.

In the case of Comparative Example 5, the slope of a viscosity increasing curve was low, compared to Examples 5 and 8 and an elongation viscosity was decreased at 10 seconds. It could be predicted that sagging of a parison slightly occurred due to the decreased elongation viscosity.

In the case of Comparative Example 6, a slope of a viscosity increasing curve was significantly low. It could be predicted that sagging of a parison severely occurred due to the significantly low slope of the viscosity increasing curve.

In the case of Comparative Example 8, a slope of a viscosity increasing curve was low compared to Example 5 and Example 8 and an elongation viscosity was decreased at 10 seconds. It could be predicted that sagging of a parison occurred due to the decreased elongation viscosity.

The invention claimed is:

1. A heat-resistant resin composition, comprising:
   a first copolymer comprising a conjugated diene-based polymer, units derived from an aromatic vinyl-based monomer, and units derived from a vinyl cyan monomer-based monomer;
   a second copolymer comprising units derived from an aromatic vinyl-based monomer and units derived from a vinyl cyan monomer-based monomer and having a glass transition temperature of 115° C. or more; and
   a third copolymer comprising units derived from an aromatic vinyl-based monomer and units derived from a vinyl cyan monomer-based monomer,
   wherein the second copolymer has a linear shape, and the third copolymer has a branched shape and a branched degree of 2 to 8,
   wherein the third copolymer has an absolute molecular weight of 500,000 to 700,000 g/mol.

2. The heat-resistant resin composition according to claim 1, wherein the third copolymer has a branched degree of 5 to 7.

3. The heat-resistant resin composition according to claim 1, wherein the third copolymer comprises the units derived from the aromatic vinyl-based monomer and the units derived from the vinyl cyan-based monomer in a weight ratio of 60:40 to 90:10.

4. The heat-resistant resin composition according to claim 1, wherein the third copolymer has a polydispersity index of 3.0 to 5.0.

5. The heat-resistant resin composition according to claim 1, wherein the first copolymer comprises:
   40 to 75% by weight of the conjugated diene-based polymer;
   18 to 43% by weight of the units derived from the aromatic vinyl-based monomer; and
   7 to 17% by weight of the units derived from the vinyl cyan-based monomer, based on a total weight of the first copolymer.

6. The heat-resistant resin composition according to claim 1, wherein the conjugated diene-based polymer has an average particle diameter of 0.1 to 0.5 μm.

7. The heat-resistant resin composition according to claim 1, wherein the first copolymer has a graft ratio of 30 to 60%.

8. The heat-resistant resin composition according to claim 1, wherein a weight average molecular weight of a shell constituting the first copolymer is 50,000 to 200,000 g/mol.

9. The heat-resistant resin composition according to claim 1, wherein the second copolymer has a glass transition temperature of 115° C. to 150° C.

10. The heat-resistant resin composition according to claim 1, wherein the second copolymer comprises the units derived from the aromatic vinyl-based monomer and the units derived from the vinyl cyan-based monomer in a weight ratio of 60:40 to 90:10.

11. The heat-resistant resin composition according to claim 1, wherein the second copolymer has a weight average molecular weight of 80,000 to 150,000 g/mol.

12. The heat-resistant resin composition according to claim 1, wherein the heat-resistant resin composition comprises:
   20 to 55% by weight of the first copolymer;
   30 to 75% by weight of the second copolymer; and
   2 to 20% by weight of the third copolymer, based on a total weight of the heat-resistant resin composition.

13. The heat-resistant resin composition according to claim 1, wherein the heat-resistant resin composition further comprises a fourth copolymer comprising units derived from an aromatic vinyl-based monomer and units derived from a vinyl cyan monomer-based monomer and having a glass transition temperature of 106° C. or less and a linear shape.

14. The heat-resistant resin composition according to claim 13, wherein the fourth copolymer has a glass transition temperature of 102 to 106° C.

15. The heat-resistant resin composition according to claim 13, wherein the fourth copolymer comprises the units derived from the aromatic vinyl-based monomer and the units derived from the vinyl cyan-based monomer in a weight ratio of 50:50 to 90:10.

16. The heat-resistant resin composition according to claim 13, wherein the fourth copolymer has a weight average molecular weight of 80,000 to 250,000 g/mol.

17. The heat-resistant resin composition according to claim 13, wherein the fourth copolymer is comprised in an amount of 30% by weight or less based on a total weight of the heat-resistant resin composition.

18. An automobile spoiler manufactured using the heat-resistant resin composition according to claim 1.

19. A heat-resistant resin composition, comprising:
   a first copolymer comprising a conjugated diene-based polymer, units derived from an aromatic vinyl-based monomer, and units derived from a vinyl cyan monomer-based monomer;

a second copolymer comprising units derived from an aromatic vinyl-based monomer and units derived from a vinyl cyan monomer-based monomer and having a glass transition temperature of 115° C. or more; and a third copolymer comprising units derived from an aromatic vinyl-based monomer and units derived from a vinyl cyan monomer-based monomer, wherein the second copolymer has a linear shape, and the third copolymer has a branched shape and a branched degree of 2 to 8, wherein the first copolymer comprises:

40 to 75% by weight of the conjugated diene-based polymer;

18 to 43% by weight of the units derived from the aromatic vinyl-based monomer; and 7 to 17% by weight of the units derived from the vinyl cyan-based monomer, based on a total weight of the first copolymer.

20. A heat-resistant resin composition, comprising:

a first copolymer comprising a conjugated diene-based polymer, units derived from an aromatic vinyl-based monomer, and units derived from a vinyl cyan monomer-based monomer;

a second copolymer comprising units derived from an aromatic vinyl-based monomer and units derived from a vinyl cyan monomer-based monomer and having a glass transition temperature of 115° C. or more; and a third copolymer comprising units derived from an aromatic vinyl-based monomer and units derived from a vinyl cyan monomer-based monomer, wherein the second copolymer has a linear shape, and the third copolymer has a branched shape and a branched degree of 2 to 8, wherein the heat-resistant resin composition comprises:

20 to 55% by weight of the first copolymer;

30 to 75% by weight of the second copolymer; and 2 to 20% by weight of the third copolymer, based on a total weight of the heat-resistant resin composition.

* * * * *